United States Patent
Nakashima et al.

(10) Patent No.: US 6,219,406 B1
(45) Date of Patent: Apr. 17, 2001

(54) BACK WIRING BOARD AND AGGREGATED DEVICE

(75) Inventors: Naoyuki Nakashima; Toshitsugu Kobayashi; Naoto Hamanaka; Kazuyoshi Maruyama; Masahiro Tanaka, all of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/120,933

(22) Filed: Jul. 22, 1998

(30) Foreign Application Priority Data

Feb. 25, 1998 (JP) .................................................. 10-043904

(51) Int. Cl.[7] ............................. H04M 1/24; H04M 3/08; H04M 3/22
(52) U.S. Cl. ..................................... 379/6; 379/27; 379/29
(58) Field of Search .................................... 379/1–2, 6, 8, 379/10, 12, 16–17, 19–20, 22, 26–29

(56) References Cited

U.S. PATENT DOCUMENTS

| | | | |
|---|---|---|---|
| 5,361,293 | * 11/1994 | Czerwiec | 379/29 |
| 5,471,517 | * 11/1995 | Nakagawa | 379/29 |
| 5,504,753 | * 4/1996 | Renger et al. | 714/712 |
| 5,559,854 | * 9/1996 | Suzuki | 379/27 |
| 5,920,608 | * 7/1999 | Minegishi | 379/1 |

FOREIGN PATENT DOCUMENTS 3261262   11/1991   (JP) .
8107451   4/1996   (JP) .

* cited by examiner

*Primary Examiner*—Duc Nguyen
(74) *Attorney, Agent, or Firm*—Helfgott & Karas, P.C.

(57) ABSTRACT

A back wiring board which connects a printed board package to testers and an aggregated device of back wiring boards. A receiving portion receives a test demand signal from an external controller, a selector selects and connects one of the testers connected to adapter connectors for the connection to the printed board package based on the test demand signal. Group connectors connect a plurality of the back wiring boards to form a board group. The selector selects and connects one of the testers only to the printed board package connected to one of the back wiring boards within the board group based on the test demand signal.

5 Claims, 19 Drawing Sheets

FIG.12

| SELECTION SIGNAL | | | LOOP-BACK SIGNAL | OPERATING RELAY |
|---|---|---|---|---|
| SEL2 | SEL1 | SEL0 | LPB | |
| 1 | 1 | 1 | 1 | NON-OPERATION |
| 1 | 1 | 0 | 1 | RL0 |
| 1 | 0 | 1 | 1 | RL1 |
| 1 | 0 | 0 | 1 | RL2 |
| 0 | 1 | 1 | 1 | RL3 |
| 0 | 1 | 0 | 1 | RL4 |
| 0 | 0 | 1 | 1 | RL5 |
| 0 | 0 | 0 | 1 | RL6 |

FIG.13

| | SIGNAL | STATUS | OPERATING RELAY | CONTENT |
|---|---|---|---|---|
| 1 | SEP2I | "0" | RL7a | CONNECTION EXISTS BETWEEN TESTER (HLTE) AND #2 CIRCUIT IN SELECTION GROUP OF TESTER |
| | | "1" | | NO CONNECTION EXISTS BETWEEN TESTER (HLTE) AND #2 CIRCUIT IN SELECTION GROUP OF TESTER |
| 2 | SEP3I | "0" | RL8a | CONNECTION EXISTS BETWEEN TESTER (HLTE) AND #3 CIRCUIT IN SELECTION GROUP OF TESTER |
| | | "1" | | NO CONNECTION EXISTS BETWEEN TESTER (HLTE) AND #3 CIRCUIT IN SELECTION GROUP OF TESTER |
| 3 | SEP2O | "0" | RL7b | CONNECTION EXISTS BETWEEN TESTER (HLTE) AND #2 CIRCUIT EXCEPT SELECTION GROUP OF TESTER (CONNECTION EXISTS TO #2 CIRCUIT OF OTHER SELECTION GROUP) |
| | | "1" | | CONNECTION EXISTS BETWEEN TESTER (HLTE) AND #2 CIRCUIT IN SELECTION GROUP OF TESTER (NO CONNECTION EXISTS TO #2 CIRCUIT OF OTHER SELECTION GROUP) |
| 4 | SEP3O | "0" | RL8b | CONNECTION EXISTS BETWEEN TESTER (HLTE) AND #3 CIRCUIT EXCEPT SELECTION GROUP OF TESTER (CONNECTION EXISTS TO #2 CIRCUIT OF OTHER SELECTION GROUP) |
| | | "1" | | CONNECTION EXISTS BETWEEN TESTER (HLTE) AND #3 CIRCUIT EXCEPT SELECTION GROUP OF TESTER (NO CONNECTION EXISTS TO #2 CIRCUIT OF OTHER SELECTION GROUP) |
| 5 | SEP4 | "0" | RL9 | CONNECTION EXISTS BETWEEN TESTER (HLTE) AND #4 CIRCUIT IN SELECTION GROUP OF TESTER |
| | | "1" | | NO CONNECTION EXISTS BETWEEN TESTER (HLTE) AND #4 CIRCUIT IN SELECTION GROUP OF TESTER |
| 6 | SEP5 | "0" | RL10 | CONNECTION EXISTS BETWEEN TESTER (HLTE) AND #5 CIRCUIT IN SELECTION GROUP OF TESTER |
| | | "1" | | NO CONNECTION EXISTS BETWEEN TESTER (HLTE) AND #5 CIRCUIT IN SELECTION GROUP OF TESTER |

PRESENT INVENTION

BACK WIRING BOARD AND AGGREGATED DEVICE

BACKGROUND OF THE INVENTION

1. Field of the Invention

The present invention relates to a back wiring board and an aggregated device of back wiring boards, and in particular to a back wiring board which connects a printed board package mounted thereon to testing equipments (testers) and an aggregated device thereof.

In recent years, an electronic device has been required to have not only a high-performance and a high-quality but also a low price and a compactness. In order to reduce the price of e.g. a switchboard system in its entirety and to compact same, the connection and the arrangement of units such as a subscriber circuit unit and a testing unit are important constitutional elements.

2. Related Prior Art

FIG. 17 shows an arrangement (1) of a switchboard system having the prior art back wiring board as a component. This switchboard system is mainly composed of a communication channel system, a central processing system, and an I/O system.

The communication channel system has a subscriber circuit (SLC) shelf 210 connected to telephones 100a–100n. The central processing system has a switching unit (SW) 400 connected to the subscriber circuit shelf 210 and a central processing unit (CC) 410 connected to the switching unit 400. The I/O system has a terminal equipment 420 connected to the central processing unit 410.

The subscriber circuit shelf 210 is composed of subscriber circuit units 212a–212n respectively connected to the telephones 100a–100n, a selector 211 connected in parallel with the subscriber circuit units 212a–212n by means of a conductor pattern PP on a back wiring board (not shown), and a common line trunk 214 connected to the subscriber circuit units 212a–212n and the selector 211 through the back wiring board and connected to the switching unit 400.

A jumper terminal frame (JPTF) is connected to the selector 211 through connectors CNa, CNb with a cable CBL, and is connected to testers 300a–300m through a cable CBL1.

The subscriber circuit units 212a–212n are respectively composed of relays RL1, RL2 respectively connected in cascade connection to the telephones 100a–100n and a subscriber circuit (SLC) 2121. The relays RL1, RL2 are connected to the selector 211 through the conductor pattern PP on the back wiring board. The selector 211 is composed of relays RL3, RL4 selectively connecting the conductor pattern PP to the connectors CNa, CNb.

In operation, the relays RL1, RL2 are normally preset so that the telephones 100a–100n may be respectively connected to the subscriber circuit 2121 in each of the subscriber circuit units 212a–212n.

When the subscriber circuit unit 212n is to be tested or examined with the tester 300m as one example, a terminal connected to the tester 300m is connected to a terminal connected to the selector 211 by means of lapping in the jumper terminal frame 900. After the connection, the terminal equipment 420 transmits a test demand signal to the subscriber circuit unit 212n and the selector 211 through the central processing unit 410, the switching portion 400, and the common line trunk 214.

In response to the test demand signal, the subscriber circuit unit 212n disconnects the telephone 100n from the subscriber circuit 2121 and switches over the relays RL1, RL2 so that the telephone 100n and the subscriber circuit 2121 as disconnected may be connected to the conductor pattern PP on the back wiring board. Also, in response to the test demand signal, the selector 211 properly turns on the relays RL3, RL4 so that the conductor pattern PP may be connected to the tester 300m through the jumper terminal frame 900.

As a result, the tester 300m is now connected to the telephone 100n and the subscriber circuit 2121 of the subscriber circuit unit 212n. After the execution of a predetermined test, the tester 300m transmits the test result to the terminal equipment 420 through the switching portion 400 and the central processing unit 410.

FIG. 18 shows an arrangement (2) of such a switchboard having the prior art back wiring board and the aggregated device thereof as components.

In this arrangement (2), different from the arrangement (1) of FIG. 17, the back wiring board (not shown) mounting the selector 211 within each of the subscriber circuit shelves 210a–210j and the back wiring board (not shown) mounting the selector 211 within each of the subscriber circuit shelves 210k–210p form selection groups 200a, 200b which are respectively the aggregated devices of the back wiring boards.

Also, different from the arrangement (1), the selectors 211 within the subscriber circuit shelves 210a–210j and the jumper terminal frame 900a are mutually connected with a cable CBLa through the connectors CNa, CNb, and the selectors 211 within the subscriber circuit shelves 210k–210p and the jumper terminal frame 900b are mutually connected with a cable CBLb through the connectors CNa, CNb.

In operation when the subscriber circuit 2121 and the telephone 100 (see FIG. 17) connected to the selector 211 in the subscriber circuit shelf 210p in the selection group 200b are tested by the tester 100m as an example, after the connection by the jumper terminal frame 900b, the tester 300m is connected to the telephone 100 and the subscriber circuit 2121 disconnected as above-noted through the cable CBL1b, the jumper terminal frame 900b, and the cable CBLb.

As a result, the tester 300m is capable of testing the telephone 100 and the subscriber circuit 2121. Likewise, the other subscriber circuits 2121 in the selection group 200b can be tested with any one of the testers 300a–300m.

Namely, in the selection group 200b, the testers 300a–300m can be commonly used for the subscriber circuits within the subscriber circuit units.

Also in the selection group 200a, the testers 300a–300m belonging to this selection group 200a can be connected to the subscriber circuits 2121 belonging to the shelves 210a–210j through the cable CBL1a, the jumper terminal frame 900a, and the cable CBLa to perform the test.

FIG. 19A shows a mounted example of shelves in the prior art switchboard, which are composed of two control system shelves 230, five subscriber circuit shelves 210, and a single jumper terminal frame shelf 900.

Such a switchboard having the prior art back wiring board and the aggregated device as the components requires the jumper terminal frame 900 (see FIG. 19A) between the selector connected to the subscriber circuit and the testers, as shown in FIGS. 17 and 18, in order to test the subscriber circuits.

The jumper terminal frame 900 has a subject of compactness due to the occupation of a certain mounting space.

Also, the connection in the jumper terminal frame 900 possibly becomes erroneous because a maintenance person does so manually by means of lapping etc.

Moreover, each of the selection groups as shown in FIG. 18 have 2000–3000 subscriber lines so that it is necessary to connect at least one tester of a high-price and a high-performance in addition to relatively cheap testers of a simple performance to the selection groups.

SUMMARY OF THE INVENTION

It is accordingly an object of the present invention to provide a back wiring board mounting a printed board package and an aggregated device of back wiring boards, which is made compact and free from a manual connection error, and reduced in the total number of testers mounted thereon.

For the achievement of the above-noted object, a back wiring board according to the present invention comprises an adapter connector to be connected to testers, a receiving portion for a test demand signal from an external controller, and a selector for selecting one of the testers, according to the test demand signal, which is to be connected to the printed board package.

FIG. 1 shows a schematic arrangement (1) of a switchboard system having a back wiring board 213 as a component.

The back wiring board 213 has subscriber circuit units 212a–212n which are printed board packages, a selector 211 connected to the units 212a–212n, an adapter connector CNA connected to the selector 211 with a conductor pattern PP which is an cell adapter 220, and a receiving portion (not shown).

The receiving portion and the subscriber circuit units 212a–212n are connected to the switching portion (SW) 400, the central processing unit (CC) 410 and the terminal equipment 420 in this order, which form the external controller through the common line trunk 214.

This schematic arrangement (1) is different from the prior art arrangement (1) shown in FIG. 17 in that ① the former does not have the jumper terminal frame 900 and the cable CBL in the latter and the selector 211 is connected to the adapter connector CNA with the conductor pattern PP in the cell adapter 220, and ② the tester (e.g. a howler tester) 300a-the tester (e.g. a subscriber circuit tester) 300m for confirming the normality of the functions of the subscriber circuit units 212a–212n are directly connected to the adapter connector CNA through the cable CBL1

In operation, the former and the latter have the same one except that a maintenance person is not required to make any jumper connection in the jumper terminal frame 900, and the terminal equipment 420 generates a test demand signal corresponding to a fixed connection in the cell adapter 220 instead of the jumper connection in the jumper terminal frame 900.

As a result, as shown in FIG. 19B, the jumper terminal frame 900 shown in FIG. 19A is not made necessary, and can be replaced by an additional subscriber circuit shelf at the position of the shelf where the jumper terminal frame 900 was mounted, resulting in a compact board. Also, jumper connection errors can be eliminated in the absence of the jumper terminal frame 900. Therefore, the terminal equipment 420 is not required to recognize any jumper connection when the test demand signal is transmitted, thereby eliminating connection errors due to the recognition made erroneously.

Also in the present invention, an aggregated device of the above-noted bock wiring board is provided. Each of the back wiring boards has group connectors to be connected to other back wiring boards to form a board group, and the selector selects and connects one of the testers to only the printed board package connected to one of the back wiring boards within the board group based on the test demand signal.

FIG. 2 shows an arrangement (2) of a switchboard having as components an aggregated device of grouped back wiring boards in which the back wiring board 213 shown in FIG. 1 is used in plurality as designated by "213a–213c".

Namely, selectors 211 on the back wiring boards 213a–213c included in subscriber circuit shelves 210a–210c (see FIG. 4) form a selection group 200 which is a board group and has a cable CBL2 connecting the selectors 211 through group connectors CNGa, CNGb respectively.

The testers 300a–300c are connected to the back wiring boards 213a–213c respectively through the adapter connectors CNA.

In operation, the selectors 211 in the boards 213a–213c selectively connect the adapter connectors CNA to the group connectors CNGa, CNGb based on the test demand signal from the external controller. For example, the tester 300a and back wiring board 213c are mutually connected through the cable CBL1, the back wiring board 213a (the adapter connector CNA, the cell adapter 220, and the group connector CNGa of the selector 211), the cable CBL2, and the connector CNGb of the selector 211 of the board 213c.

Namely, a selective connection of the connectors CNA, CNGa, CNGb in the selectors 211 enables the testers 300a–300c to be connected to one of the back wiring boards 213a–213c.

As a result, the back wiring boards 213a–213c are not required to fixedly connect the adapter connectors CNA to all of the testers 300a–300c as shown in FIG. 1 so that at least one set of the testers 300a–300c may be provided for the selection group 200, resulting in a reduction of the number of the testers.

Alternatively in the present invention, assuming that the group connector is a first group connector, at least one of the back wiring boards within each of the board groups has at least one second group connector for connecting the board groups. The board groups mutually connected through the second group connector form a different board group, and within the different board group, the selector selects and connects one of the testers to only the printed board package connected to one of the back wiring boards based on the test demand signal.

FIG. 3 shows a schematic arrangement (1) of an aggregated device of layered back wiring boards according to the present invention. In this arrangement (1), selection groups 200a–200d each having the same components as the selection group 200 shown in FIG. 2 are mutually connected with a cable CBL3 through second group connectors CNG2a–CNG2d.

Those selection groups 200a–200d are layered into an upper selection group 200a and a lower selection groups 200b–200d.

In operation, the selection groups 200a–200d are mutually connected through the group connectors CNG2a–CNG2d and a cable CBL3 by the selective operation of the selectors 211 respectively in the selection groups 200a–200d. For example, a tester (see FIG. 2) connected to only the upper selection group 200a can be connected to the selection groups 200b–200d for the test of circuits in the selection groups, resulting in a further reduction of the number of the testers.

In addition, the present invention can layer the testers, the board group, and the group connector by the function of the tester and the mounted position in the above-mentioned board group.

Namely, the testers are layered by the function and the mounted selection group and the group connector is layered depending on the layer of a selection group to be connected.

This will be described with reference to a schematic arrangement (2) of the aggregated device of the layered back wiring boards shown in FIG. 4 according to the present invention. It is to be noted that this schematic arrangement (2) shows the arrangement (1) in FIG. 3 in more detail.

The selection groups 200a –200d respectively include subscriber circuit shelves 210a–210c mutually connected with the cable CBL2, and are mutually connected with the cable CBL3 to form a single upper layered selection group which is the board group denoted by reference numeral "200".

The selection groups 200a –200d respectively accommodate simple testers 300a–300c connected to the subscriber circuit shelf 210a, and particularly the selection group 200a accommodates upper high-performance testers 300e, 300f. Accordingly, the selection group 200a is layered as the upper group, while the other selection groups 200b –200d are layered as the lower groups.

In operation, for example, the high-performance tester 300e mounted only on the upper selection group 200a can be connected to the shelf 210c in the lower selection group 200d through the selector 211 of the shelf 210a, the cable CBL3, and the selector 211 of the shelf 210a in the lower selection group 200d.

Therefore, the single high-performance tester 300d can test the circuits within the selection group 200a –200d belonging to the selection group 200.

Also according to the present invention, the above-noted group connectors may be plural connectors connected in parallel with each other.

Namely, the group connectors CNG2a–CNG2d of the selection groups shown in FIG. 3 may be used as plural connectors having pins connected in parallel with each other in the back wiring board.

As a result, the cable CBL3 connecting the selection groups can be arranged and connected corresponding to the mounting position of the selection groups, noise and others.

Alternatively in the present invention, a lower group connector may be used instead of an upper group connector in the board group of each layer. As a result, one group connector can be used as the group connectors.

Also in the present invention, an adapter connector may be used instead of the group connector. As a result, the adapter connector can be used as the group connectors.

BRIEF DESCRIPTION OF THE DRAWINGS

FIG. 12 is a table diagram showing a relationship between selector portions and selection signals used in the present invention;

FIG. 13 is a table diagram showing a relationship between selector portions and activation signals used in the present invention;

Throughout the figures, like reference numerals indicate like or corresponding components.

DESCRIPTION OF THE EMBODIMENTS

Figure 5:
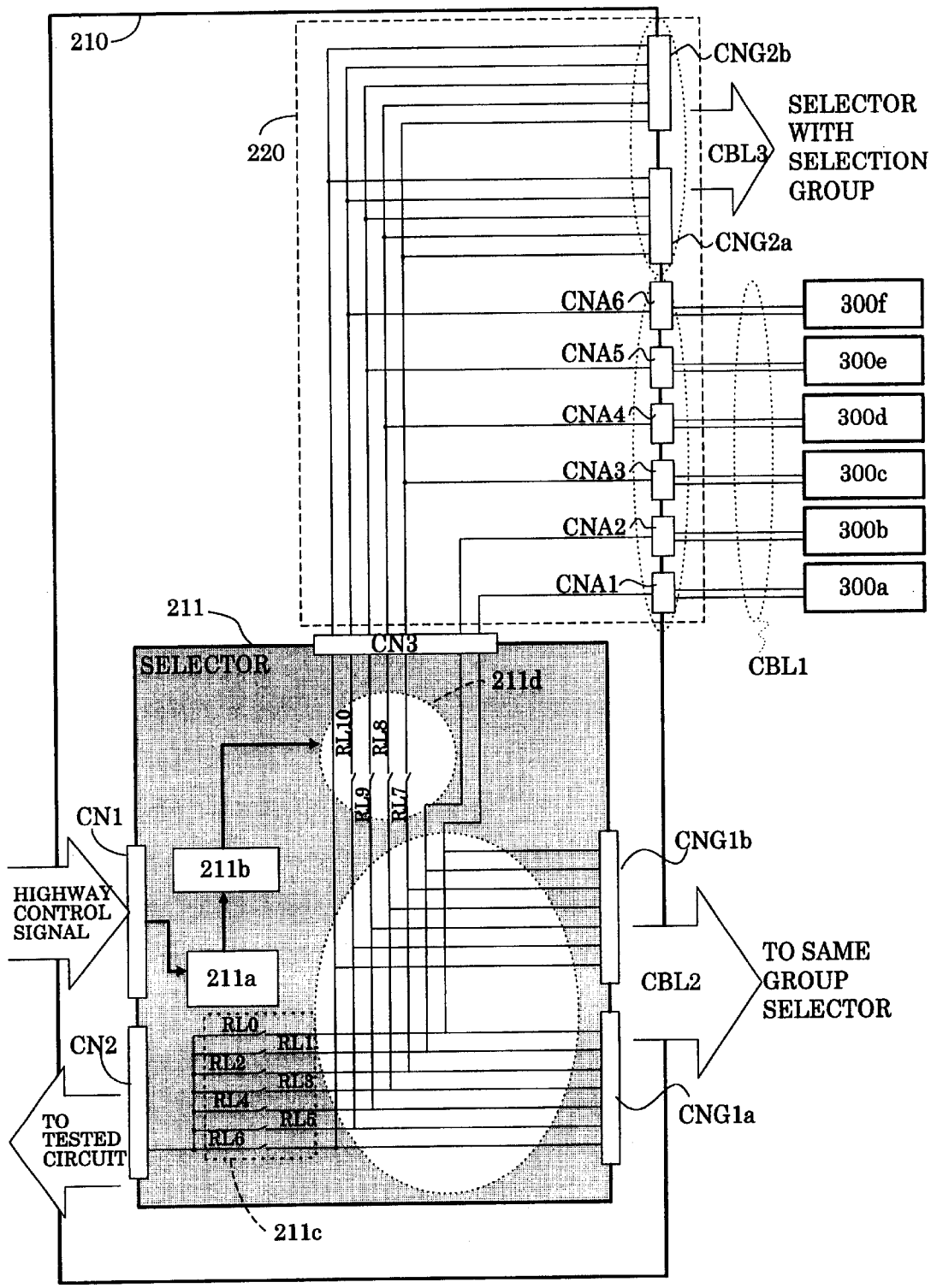
FIG. 5 is a block diagram showing an embodiment of a back wiring board according to the present invention.

FIG. 5 shows an embodiment of a back wiring board according to the present invention. The back wiring board is not shown but included in the subscriber circuit shelf 210. This shelf 210 is composed of the selector 211 and the cell adapter 220 of the conductor pattern. The cell adapter 220 has adapter connectors CNA1–CNA6 respectively connected to the simple testers 300a–300d and the high-performance testers 300e, 300f and the group connectors CNG2a, CNG2b connected to the adapter connectors CNA1–CNA6 and a connector CN3 of the selector 211.

The selector 211 is composed of a highway receiving portion 211a connected to a connector CN1, a relay controller 211b connected to the receiving portion 211a, a selection circuit 211c, a separation circuit 211d connected to the relay controller 211b, a connector CN2 commonly connected to each one end of relays RL0–RL6 included in the selection circuit 211c, group connectors CNG1a, CNG1b connected in parallel with the other ends of the relays RL0–RL6, and the connector CN3 connected to the relays RL0, RL1, RL6 directly as well as the relays RL2–RL5 through relays RL7–RL10 included in the separation circuit 211d.

It is to be noted that the selector 211 may also be mounted directly on the back wiring board. In this case, the connector CN3 is made unnecessary.

In operation, the highway receiving portion 211a transmits an activation signal for properly closing the relays RL0–RL10 to the relay controller 221b in response to the test demand signal received as an input from the terminal equipment 420 through the common line trunk 214 (see FIG. 1) whereby the relay controller 221b turns "on" the designated relay.

Figure 1:
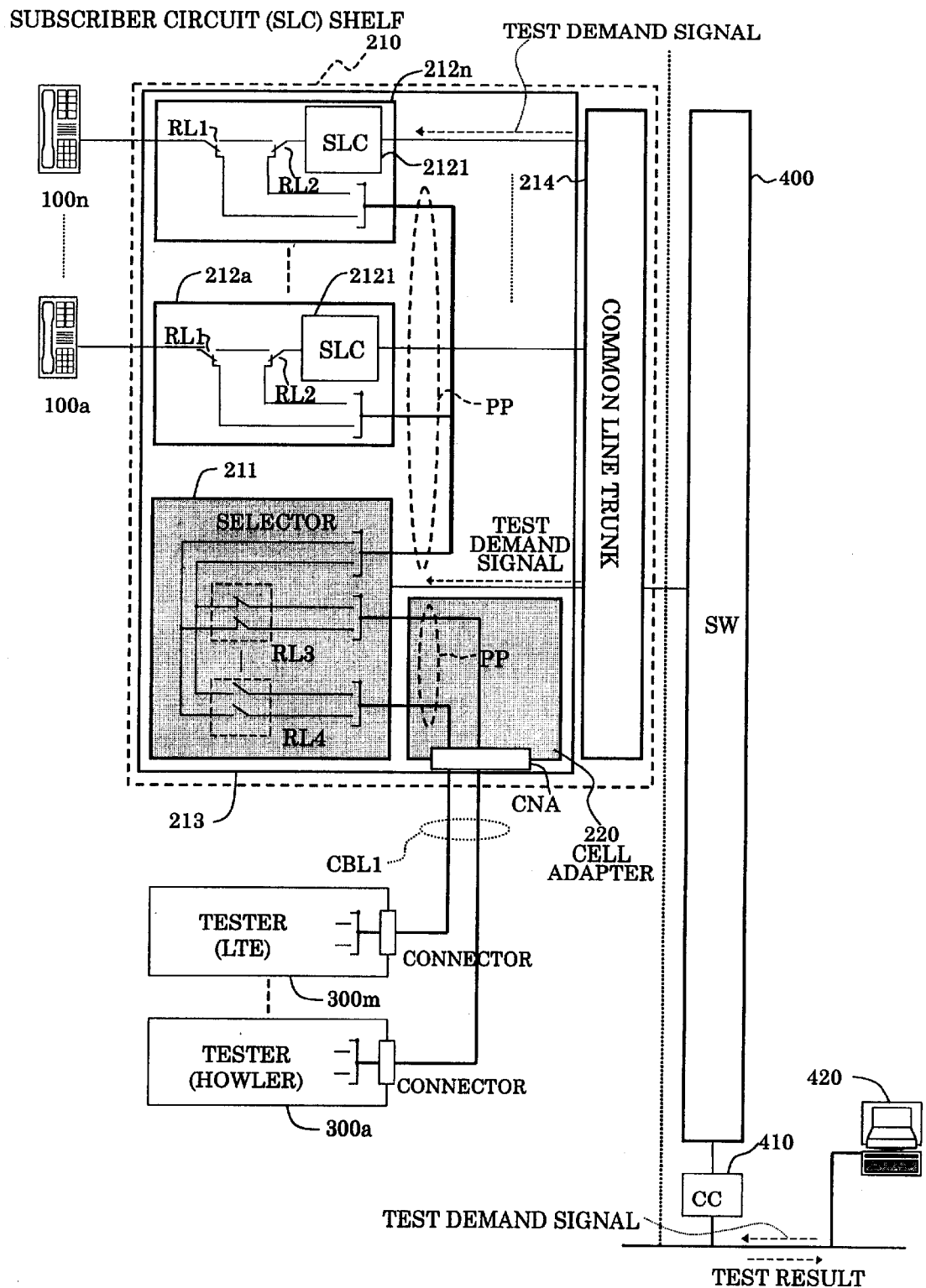
FIG. 1 is a block diagram showing a schematic arrangement (1) of a switchboard having a back wiring board as a component according to the present invention.
Figure 2:
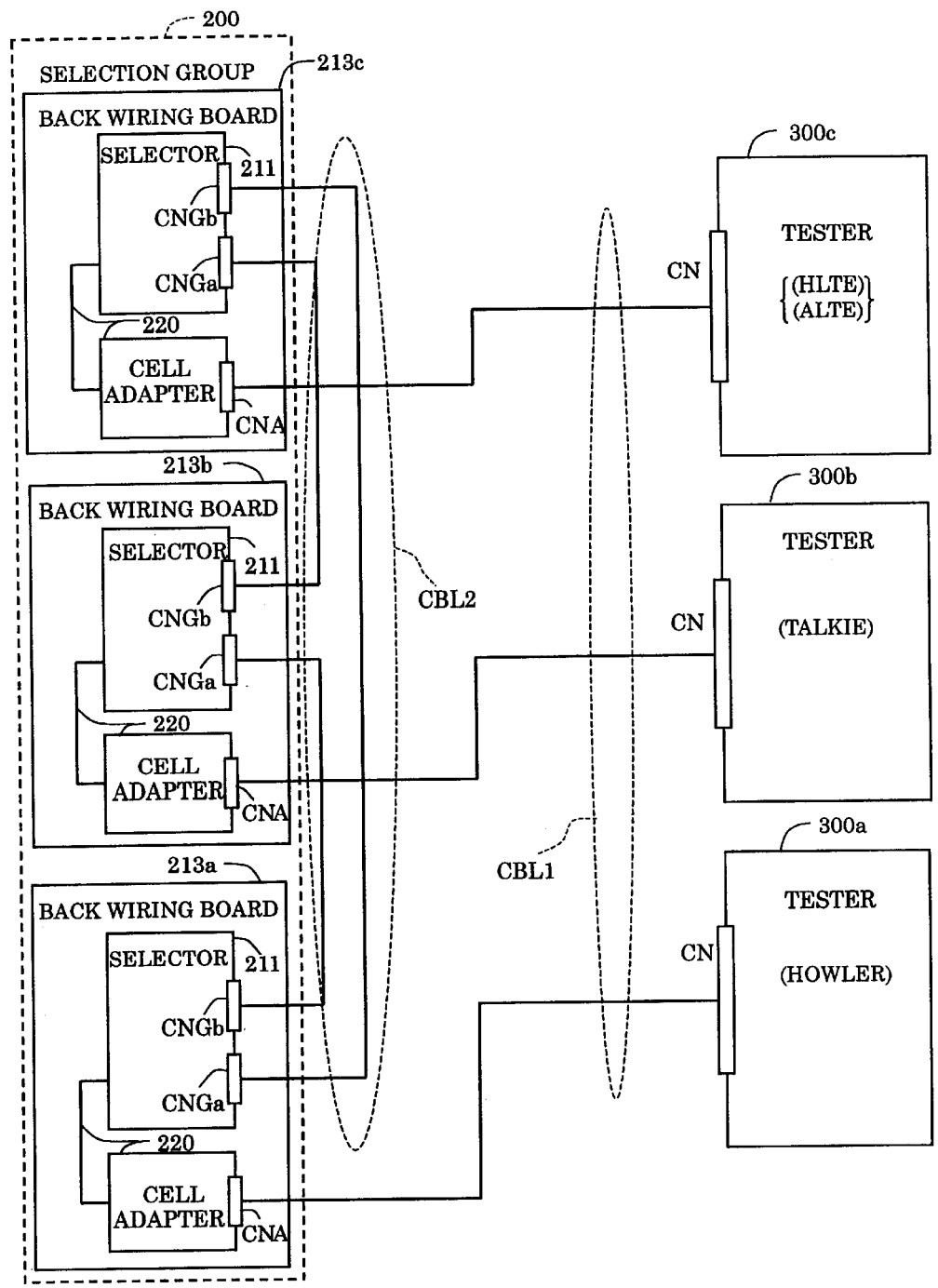
FIG. 2 is a block diagram showing a schematic arrangement (2) of a switchboard having a back wiring board as a component according to the present invention.
Figure 3:
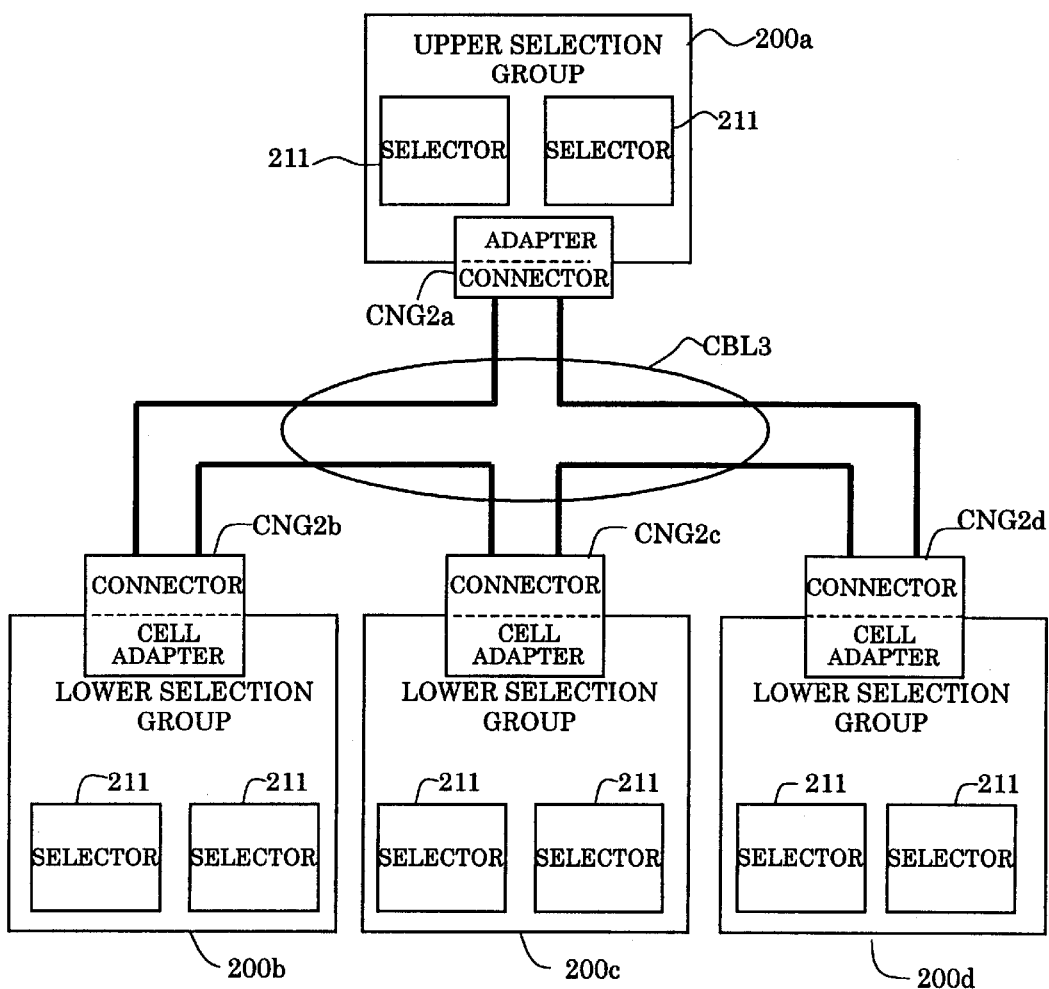
FIG. 3 is a block diagram showing a schematically layered arrangement (1) of an aggregated device of back wiring boards according to the present invention.

Taking one example, when the simple tester 300a is going to be connected to a tested circuit such as the subscriber circuit or the telephones in FIG. 1 connected to the connector CN2, the test demand signal should be the one which turns "on" the relay RL0 only. Also, in the case of the simple tester 300c, the relays RL2, RL7 should be turned "on".

When the simple-performance tester 300d is going to be connected to a tested circuit on the back wiring board (not shown) included in the subscriber circuit shelf 210b (see FIG. 4) within the same selection group 200a, only the relay RL8 in the separation circuit 211d should be turned "on" in the selector 211 of the shelf 210a, and the relay RL3 in the selection circuit 211c should be turned "on" in the selector 211 of the shelf 210b.

Likewise, when the high-performance tester 300f is going to be connected to a tested circuit of the same back wiring board, the relays RL5, RL10 should be turned "on".

On the other hand, the high-performance tester 300f is connected to the other selection groups 200b–200d (see FIG. 4) with the cable CBL3 through the group connector CNG2a or CNG2b. Therefore, the high-performance tester 300f can be used for testing the circuits within the selection groups 200b –200d by properly controlling the relays therein.

Figure 4:
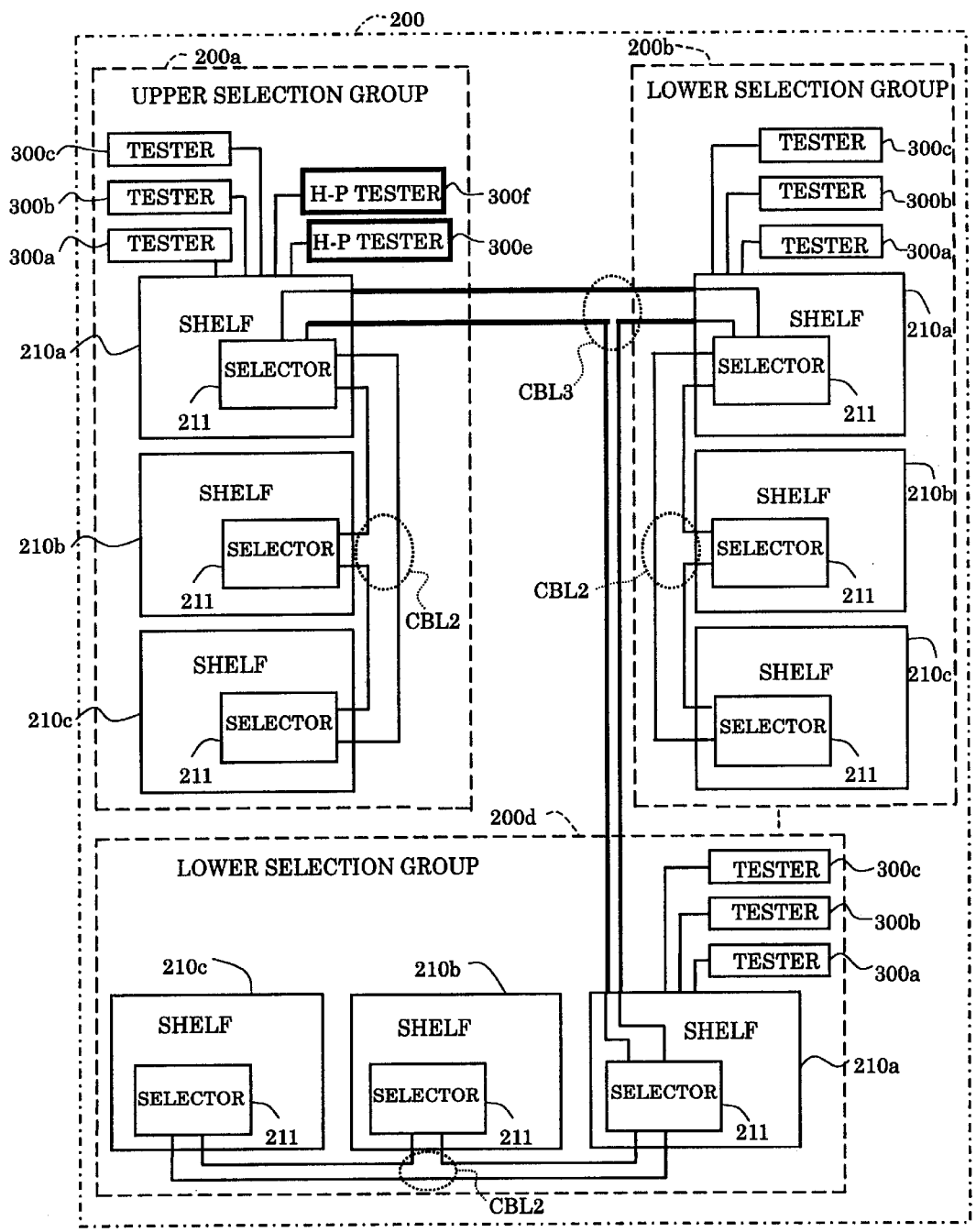
FIG. 4 is a block diagram showing a schematically layered arrangement (2) of an aggregated device of back wiring boards according to the present invention.
Figure 6:
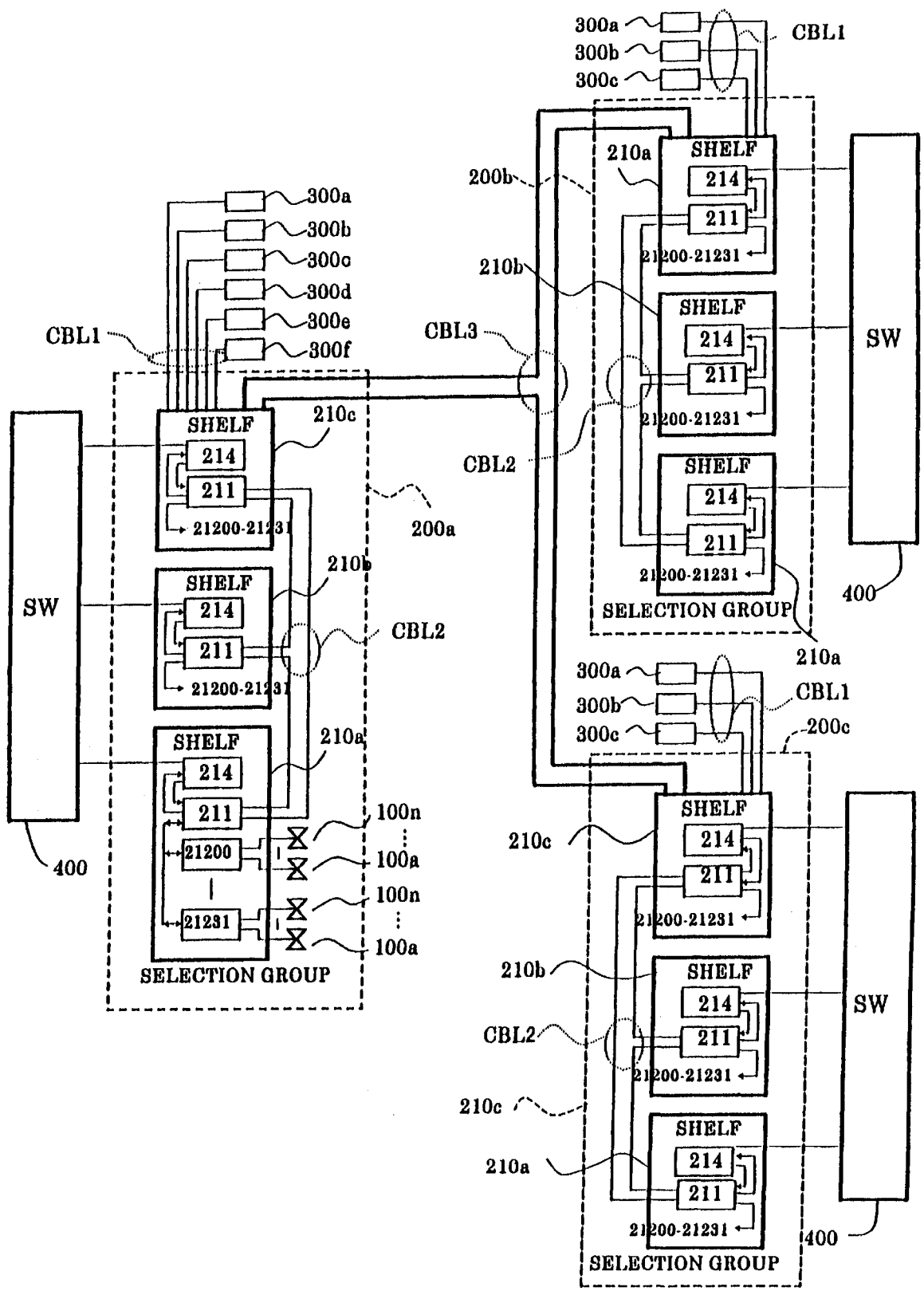
FIG. 6 is a block diagram showing an embodiment of an aggregated device of back wiring boards according to the present invention.

FIG. 6 shows an embodiment (1) of an aggregated device of back wiring boards according to the present invention wherein the selection groups 200a–200c forming an aggregated device of the back wiring boards shown in FIG. 4 are illustrated in more detail.

Namely, the switching portions (SW) 400 are connected to the selection groups 200a–200c respectively. In each of the selection groups 200a–200c, each of the shelves 210a–210c is composed of the common portion (line trunk) 214 connected to the switching portion 400, the selector 211 connected to the common portion 214, and 32 packages 21000–21031 connected to the selector 211.

Figure 7:
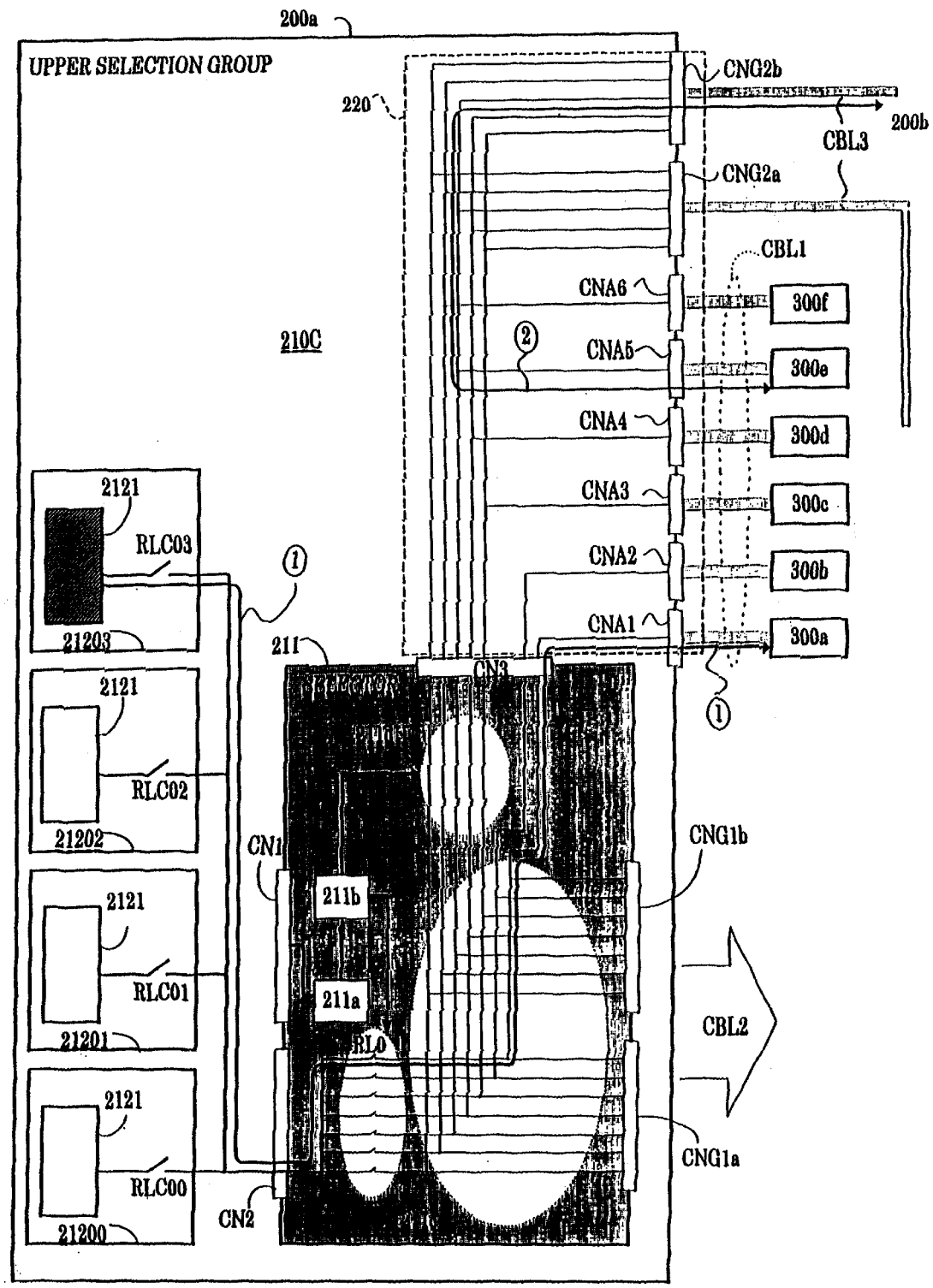
FIG. 7 is a block diagram (1) illustrating an operation in the embodiment of an aggregated device of back wiring boards according to the present invention.
Figure 8:
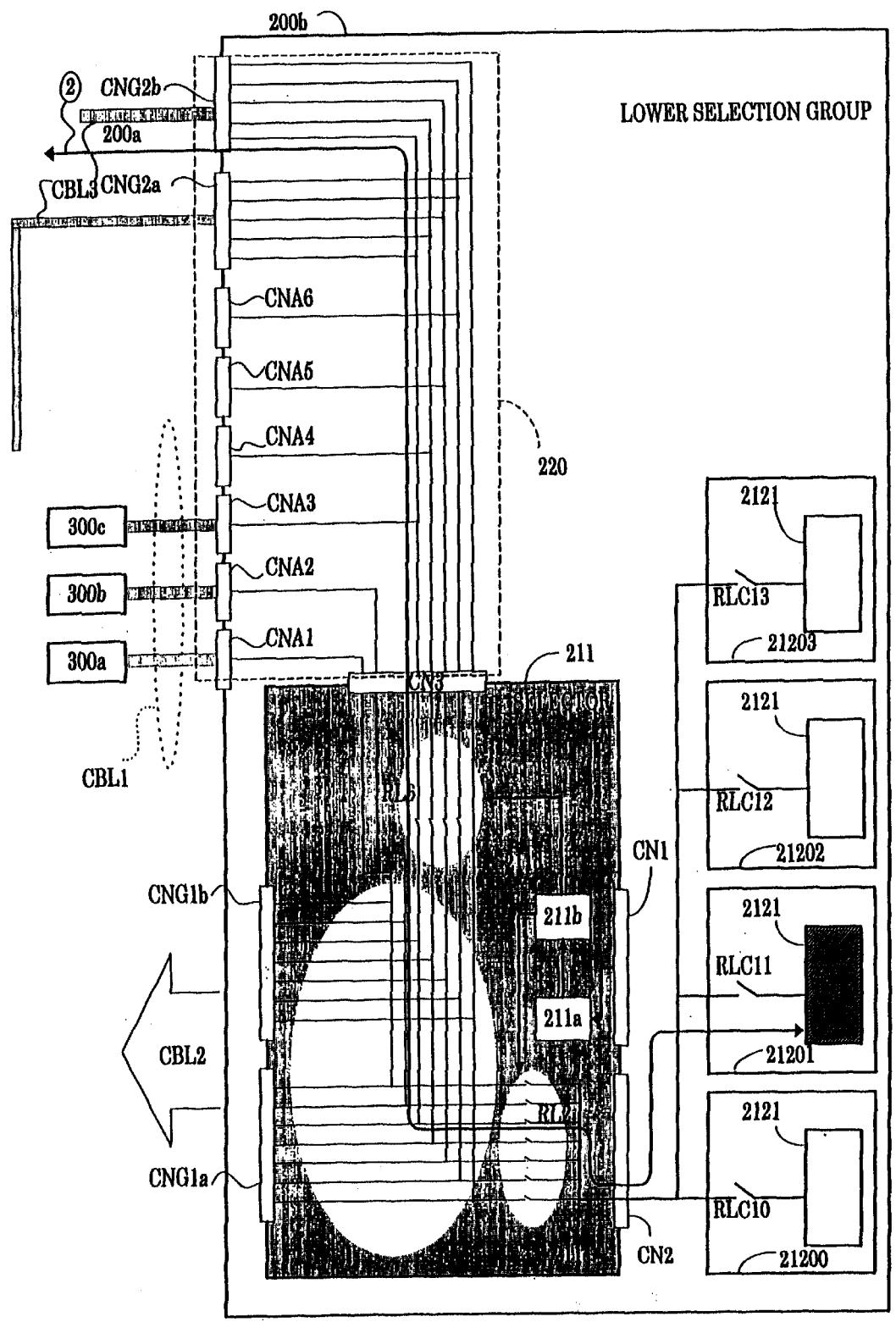
FIG. 8 is a block diagram (2) illustrating an operation in the embodiment of an aggregated device of back wiring boards according to the present invention.

FIGS. 7 and 8 illustrate operations ①, ② of the selection groups 200a, 200b in FIG. 6. Referring to these operations ①, ②, the subscriber circuit shelves 210a, 210b shown within the selection groups 200a, 200b in FIG. 6 are omitted and only the subscriber circuit shelf 210c is shown, and also the common portion 214 within the subscriber circuit shelf 210c is omitted, for illustration purposes.

The selector 211 of the subscriber circuit shelf 210c has the same arrangement as that shown in FIG. 5. To this selector 211 the subscriber circuit units 21200–21203 omitted in FIG. 5 are connected through the connector CN2. The subscriber circuit units 21200–21203 are composed of subscriber circuits 2121 and testing relays RLC00–RLC03 respectively connected between the subscriber circuits 2121 and the connector CN2.

In the operation ①, is shown the case where the simple tester 300a belonging to the selection group 200a in FIG. 7 is connected to the subscriber circuit 2121 of the subscriber circuit unit 21203.

Namely, the subscriber circuit unit 21203 receives the test demand signal which is a highway signal transmitted from the common portion 214 (see FIG. 6) and activates the testing relay RLC03 designated by the signal. The highway receiving portion 211a of the selector 211 receives the test demand signal through the connector CN1 and transfers it to the relay controller 211b, which activates the relay RL0 designated by the signal.

The simple tester 300a and the subscriber circuit 2121 of the subscriber circuit unit 21203 result in a mutual connection of a test loop ① shown by a thick line through the cable CBL1, the adapter connector CNA1 of the cell adapter 220, the connectors CN3 of the selector 211, the relays RL0, the connectors CN2, and the testing relay RLC03.

In the operation ②, is shown the case where the high-performance tester 300e of the upper selection group 200a in FIG. 7 is connected to the subscriber circuit 2121 of the subscriber circuit unit 21201 of the lower selection group 200b as shown in FIG. 8.

In the selection group 200b, the subscriber circuit unit 21201 receives the above-noted test demand signal and activates the testing relay RLC11 designated by the signal. The highway receiving portion 211a receives the test demand signal, and instructs the relay controller 211b, which activates the relays RL2, RL6 designated by the signal.

The high-performance tester 300e of the selection group 200a and the subscriber circuit unit 21201 within the subscriber circuit unit 21201 result in a mutual connection of a test loop ② shown by a thick line through the cable CBL1 of the selection group 200a, the connector CNA5 of the cell adapter 220, the group connector CNG2b, and the cable CBL3 (see FIG. 7), the cable CBL3, the group connector CNG2b of the selection group 200b of the cell adapter 220, the connector CN3, the relays RL6, RL2, the connector CN2, and the relay RLC11 (see FIG. 8).

Figure 9:
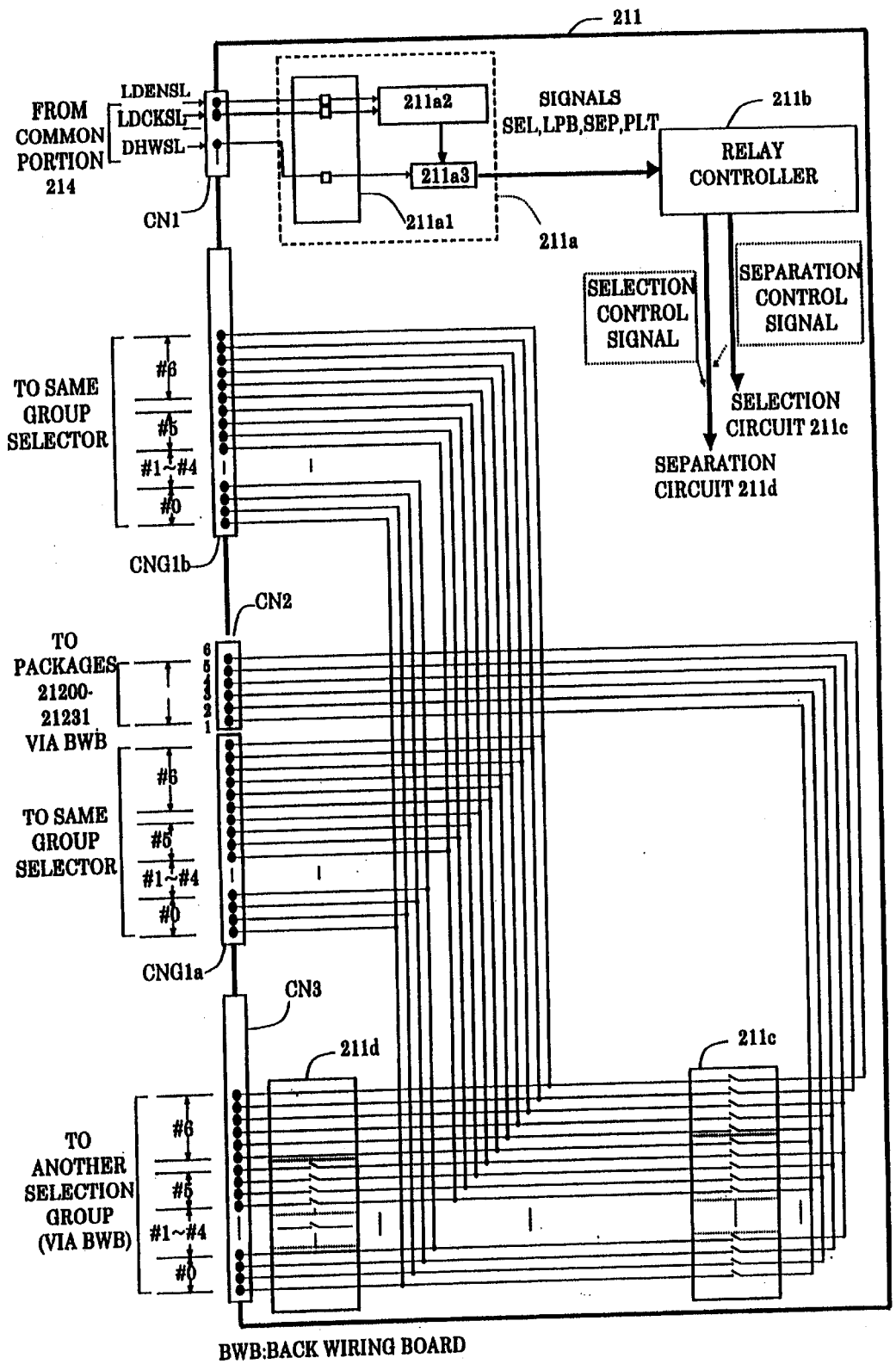
FIG. 9 is a block diagram showing an embodiment (1) of a selector used in the present invention.

FIG. 9 shows an embodiment (1) of the selector 211 mounted on the back wiring board, wherein the selector 211 in FIG. 5 is illustrated in more detail.

The selection circuit 211c is composed of five 4-contact wire relays and one 6-contact wire relays, and the separation circuit 211d is composed of five 4-contact wire relays.

The highway receiving portion 211a inputs an LDCKSL signal, an LDENSL signal, and a DHWSL signal from the connector CN1, and outputs a selection signal (SEL), a separation signal (SEP), a PLT signal, and an LPB signal to the relay controller 211b.

The relay controller 211b transmits a selection control signal and a separation control signal to the selection circuit 211c including the relays RL0–RL6 and the separation circuit 211d including the relays RL7–RL10, respectively.

The highway receiving portion 211a is composed of an I/O buffer 211a1 connected to the connector CN1, a timing generator 211a2 receiving a synchronous signal LDENSL and a clock signal LDCKSL from the I/O buffer 211a1, and a receiving portion 211a3 connected to the timing generator 211a2 to receive the DHWSL signal from the I/O buffer 211a1.

The selector 211 has a selection function by the selection circuit 211c and a separation function by the separation circuit 211d. The selection function is to lead in a test line on the telephone and the subscriber circuit sides. The separation function is to separate a tester such as the subscriber circuit tester required to be individually connected to a tested circuit from other circuits.

Figure 10:
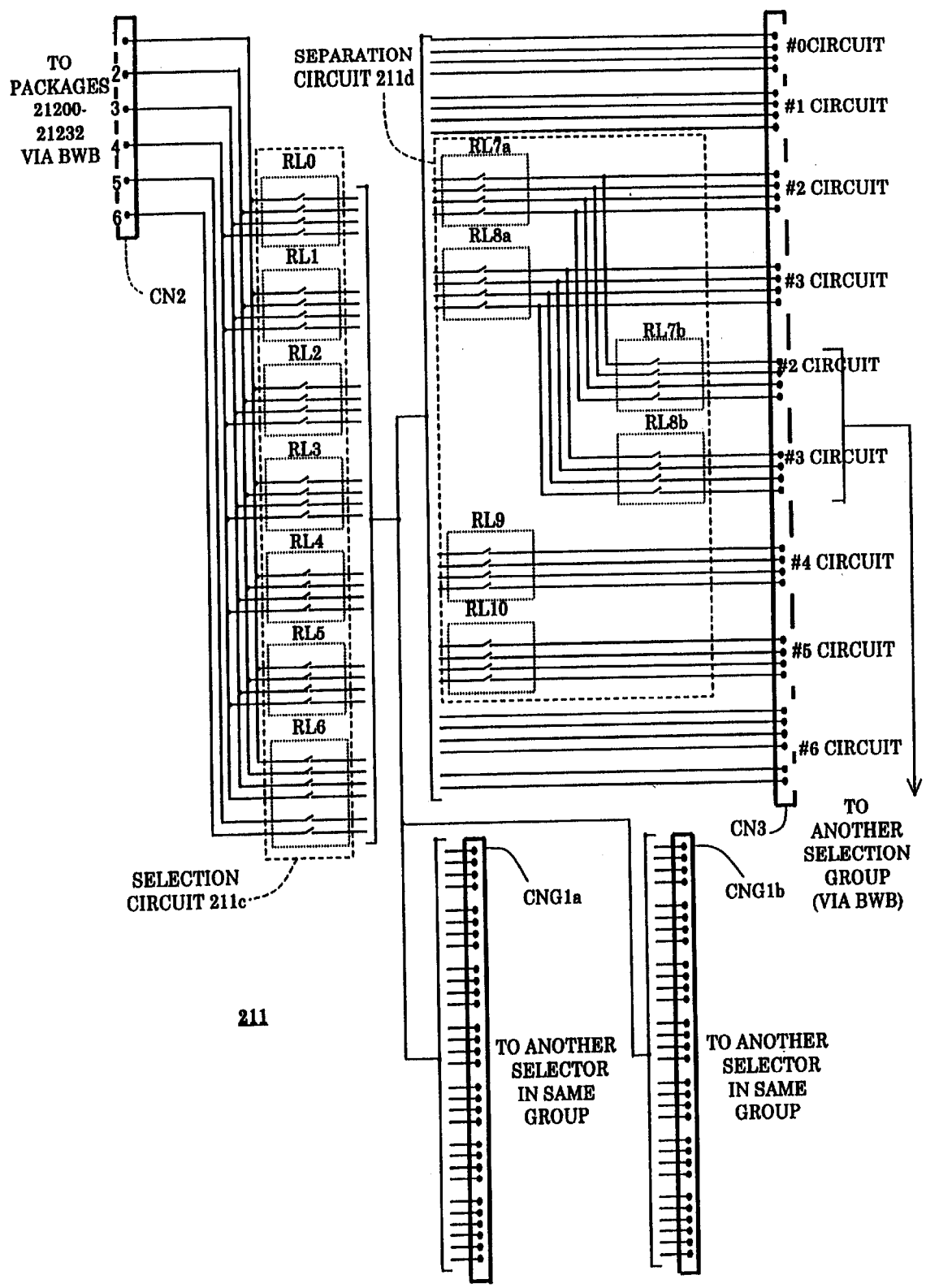
FIG. 10 is a block diagram showing an embodiment (2) of a selector used in the present invention.

FIG. 10 shows an embodiment (2) of the selector 211 wherein only the selection circuit 211c and the separation circuit 211d are shown and the highway receiving portion 211a and the relay controller 211b are omitted. This embodiment (2) is different from the embodiment (1) in FIG. 9 in that ① the relays RL7, RL8 of the separation circuit 211d in the embodiment (1) are renamed as relays RL7a, RL8a respectively, and ② relays RL7b, RL8b connected to the connector CN3 together with the relays RL7a, RL8a on one side, and to the connector CN3 solely on the other side are added.

Therefore, the selection circuit 211c is composed of 4-contact wire relays RL0–RL5 and 6-contact wire relays RL6, and the separation circuit 211d is composed of 4-contact wire relays RL7a, RL7b, RL8a, RL9b, RL9, and RL10.

Each of terminals 1–4 of the connector CN2 is commonly connected to one of 4 contacts of the relays RL0–RL6, and terminals 5, 6 thereof are connected to the remaining 2 contacts of the relay RL6, respectively. The relays RL0–RL6 are further connected in parallel with the terminals of the group connectors CNG1a, CNG1b.

Additionally, the relays RL0, RL1, and RL6 are directly connected to the connector CN3, and the relays RL2–RL5 are connected to the contacts of the relays RL7a, RL8a, RL9, and RL10.

Figure 11:
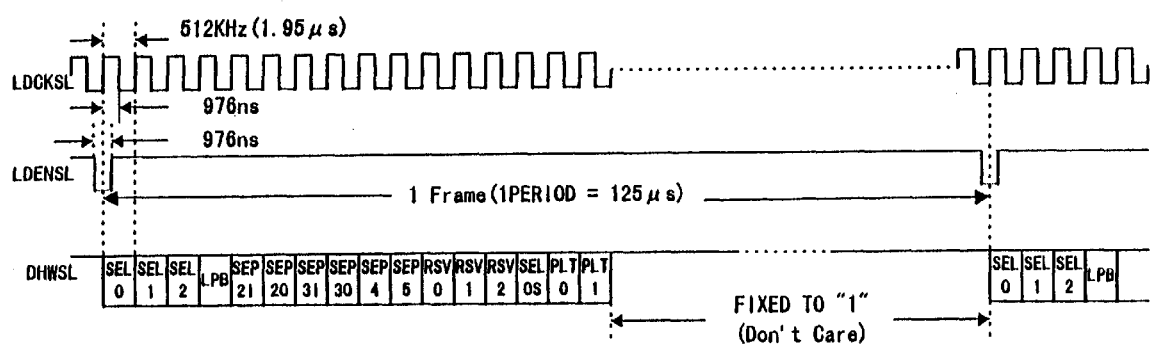
FIG. 11 is a format diagram of a test demand signal received by a selector used in the present invention.

FIG. 11 shows a format of the LDCKSL signal, the LDENSL signal, and the DHWSL signal received by the I/O buffer 211a1 shown in FIG. 9 through the connector CN1.

The LDCKSL signal is a timing pulse having the pulse width of 976 ns and the frequency of 512 KHz (1 period ≒1.95 μs), and the LDENSL signal is a synchronous pulse having the pulse width of 976 ns (1 period=125 μs). The DHWSL signal which is the test demand signal is a control signal having 1 period of 125 μs in which 1 frame is formed of 64 bits (1st–64th bits). The 1st bit is designated by the synchronous signal LDENSL.

The 1st–3rd bits are "SEL0"–"SEL2" which are selection circuit activation signals, the 4th bit is "LPB" which is a loop-back circuit activation signal, and 5th–10th bits are "SEP2I", "SEP2O", "SEP3I", "SEP3O", "SEP4", "SEP5" which are separation circuit activation signals.

The 11th–13th bits are "RSV0–RSV2" which are auxiliary bits, the 14th bit is "SELOS" which is a Busy/Out-of-Service (OS) signal, the 15th and 16th bits are "PLT0", "PLT1" which monitor the normality of the data of the signal DHWSL, and the 17th–64th bits are "Don't Care" bits fixed to "1".

It is to be noted that circuits relating to the loop-back circuit activation signal, the Busy/OS signal and the monitoring signal of the data normality shown in FIG. 11 are omitted in FIG. 9.

Hereinafter, the operations of the highway receiving portion 211a and the relay controller 211b in FIG. 9 will be described with reference to FIG. 11. In FIG. 9, the timing generator 211a2 receives the clock signal LDCKSL and the synchronous signal LDENSL and transmits shift/latch timing signals to the receiving portion 211a3. This receiving portion 211a3 shifts the serial DHWSL signal and then latches it to provide a parallel signal, which is to be transferred to the relay controller 211b.

By the reception of the parallel DHWSL signal, the relay controller 211b provides a selection control signal for turning on/off the relays RL0–RL6 of the selection circuit 211c, and a separation control signal for turning on/off the relay RL7–RL10 of the separation circuit 211d.

FIG. 12 shows a relationship of the selection signals "SEL 0"–"SEL2" and the loop-back signal "LPB" in the signal DHWSL with the operating relays (RL0–RL6) in the relay controller 211b.

Namely, the relays RL0–RL6 are turned "on" only when the selection signals SEL2–SEL0 are ("1", "1", "0"), ("1", "0", "1"), . . . ,("0", "0", "0") and "LPB" is "1", and are turned "Off" when the selection signals SEL2–SEL0 are ("1", "1", "1") and "LPBI" is "1".

It is to be noted that at least two of the relays RL0–RL6 are prohibited from being turned "on" at the same time for the prevention of the collision of the signals in the tested circuits.

It is also to be noted that the control operations of the relays RL0–RL6 in FIG. 10 are the same as those in FIG. 9.

FIG. 13 shows a relationship of the separation signals "SEP2I", "SEP3I", "SEP2O", "SEP3O", "SEP4", and "SEP5" in the DHWSL signal in the relay controller 211b shown in FIGS. 9 and 10 and the relays RL7a, RL8a, RL7b, RL8b, RL9, and RL10 of the separation circuit 211d to be driven.

Namely, when the separation signal "SEP2I" is "0", the relay RL7a is turned "on", and when the separation signal "SEP2I" is "1", the relay RL7a is turned "off". Similarly, the separation signals "SEP3I", "SEP2O", "SEP3O", "SEP4", "SEP5" are "0" or "1", the corresponding relays RL8a, RL7b, RL8b, RL9, and RL10 are turned "on" or "off", respectively.

It is to be noted that the relays RL7a, RL8a, RL7b, RL8b RL9, RL10 of the separation circuit 211d can be turned "on" concurrently with the relays RL0–RL6 of the selection circuit 211c.

Also, the relays of the separation circuit 211d can be turned "on" at the same time.

Figure 14:
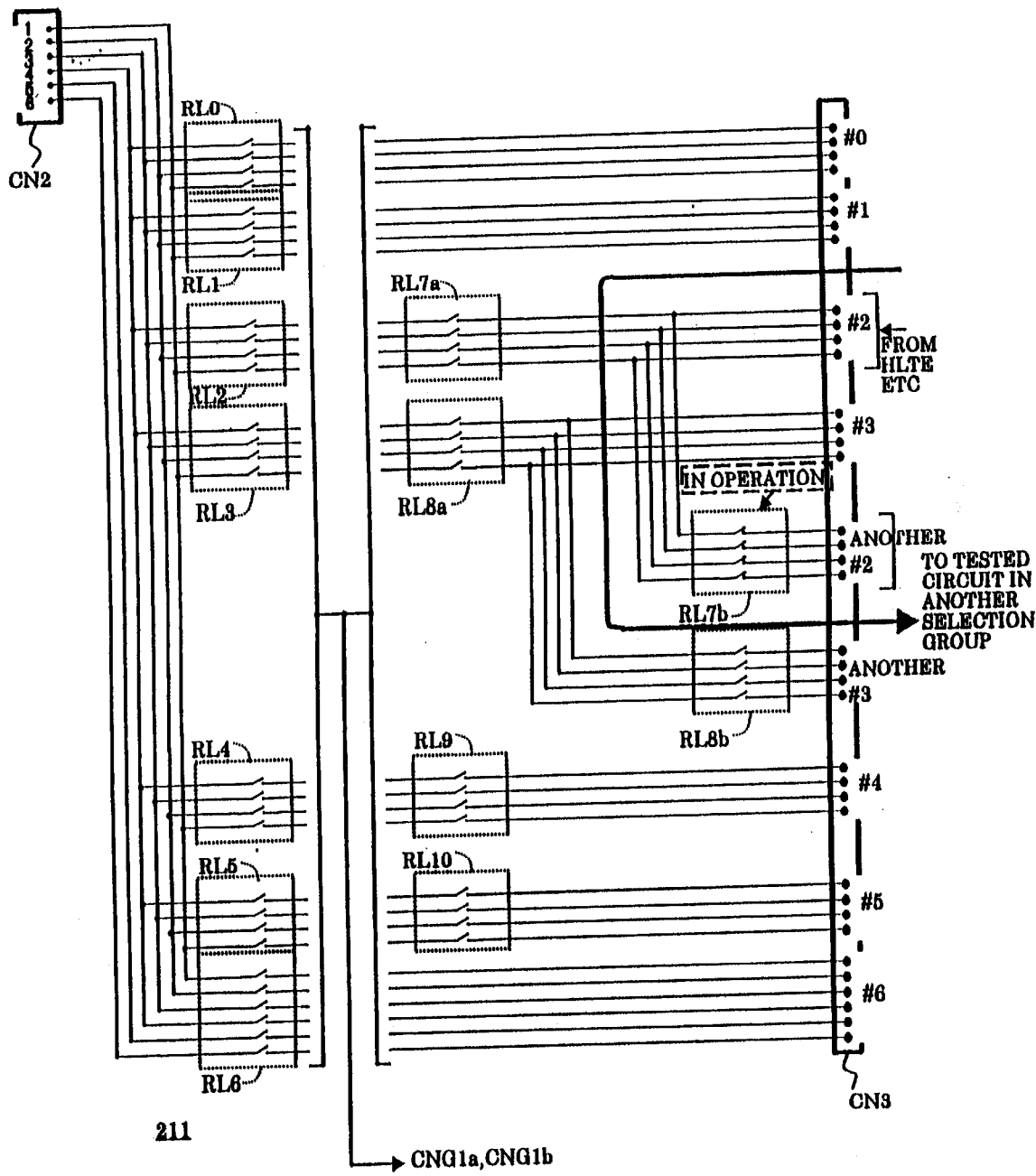
FIG. 14 is a block diagram illustrating an operation (a) in the embodiment (2) of the selector used in the present invention.
Figure 15:
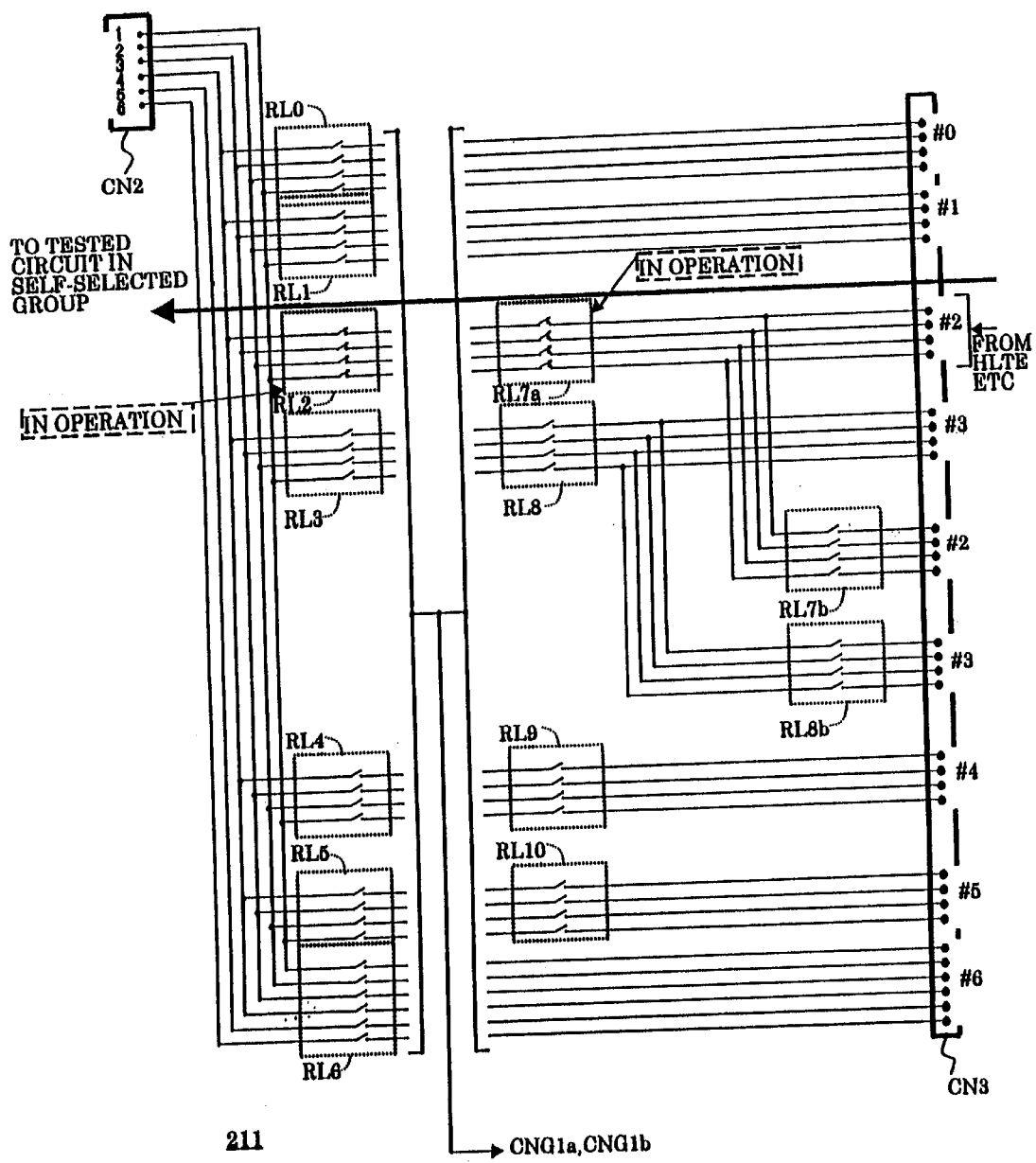
FIG. 15 is a block diagram illustrating an operation (b) in the embodiment (2) of the selector used in the present invention.
Figure 16:
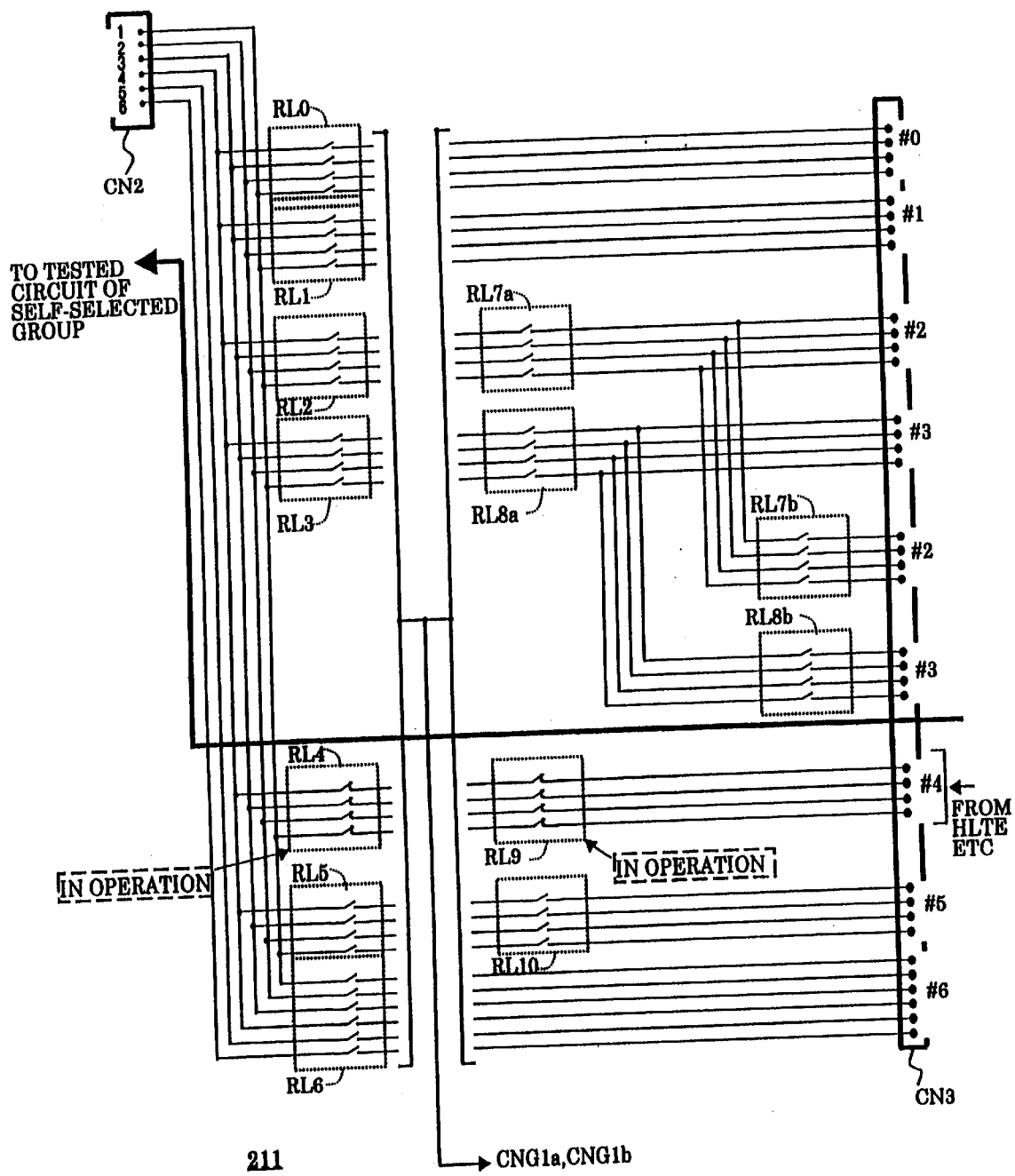
FIG. 16 is a block diagram illustrating an operation (c) in the embodiment (2) of the selector used in the present invention.
Figure 17:
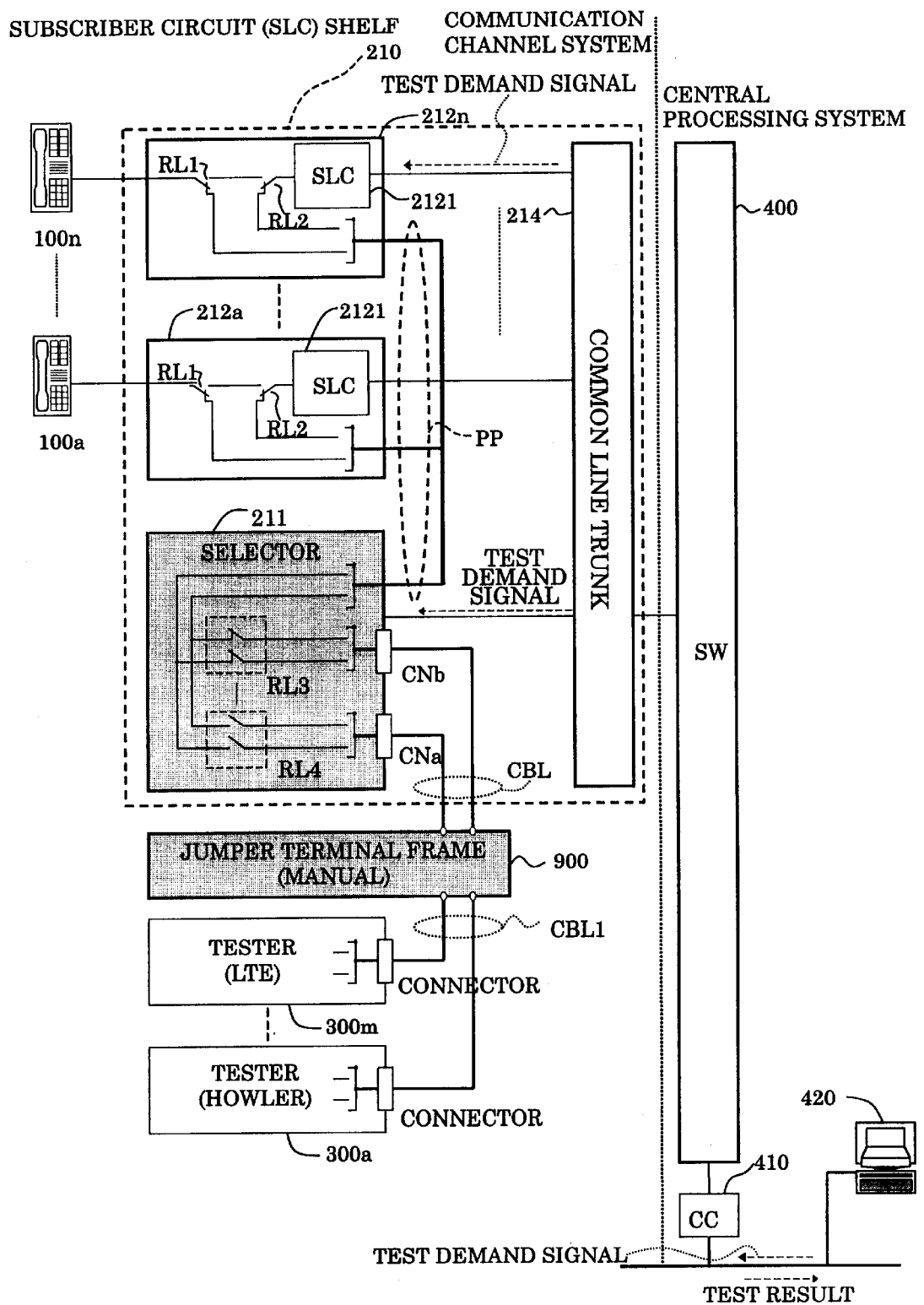
FIG. 17 is a block diagram showing an arrangement (1) of a switchboard having the prior art back wiring board as a component.
Figure 18:
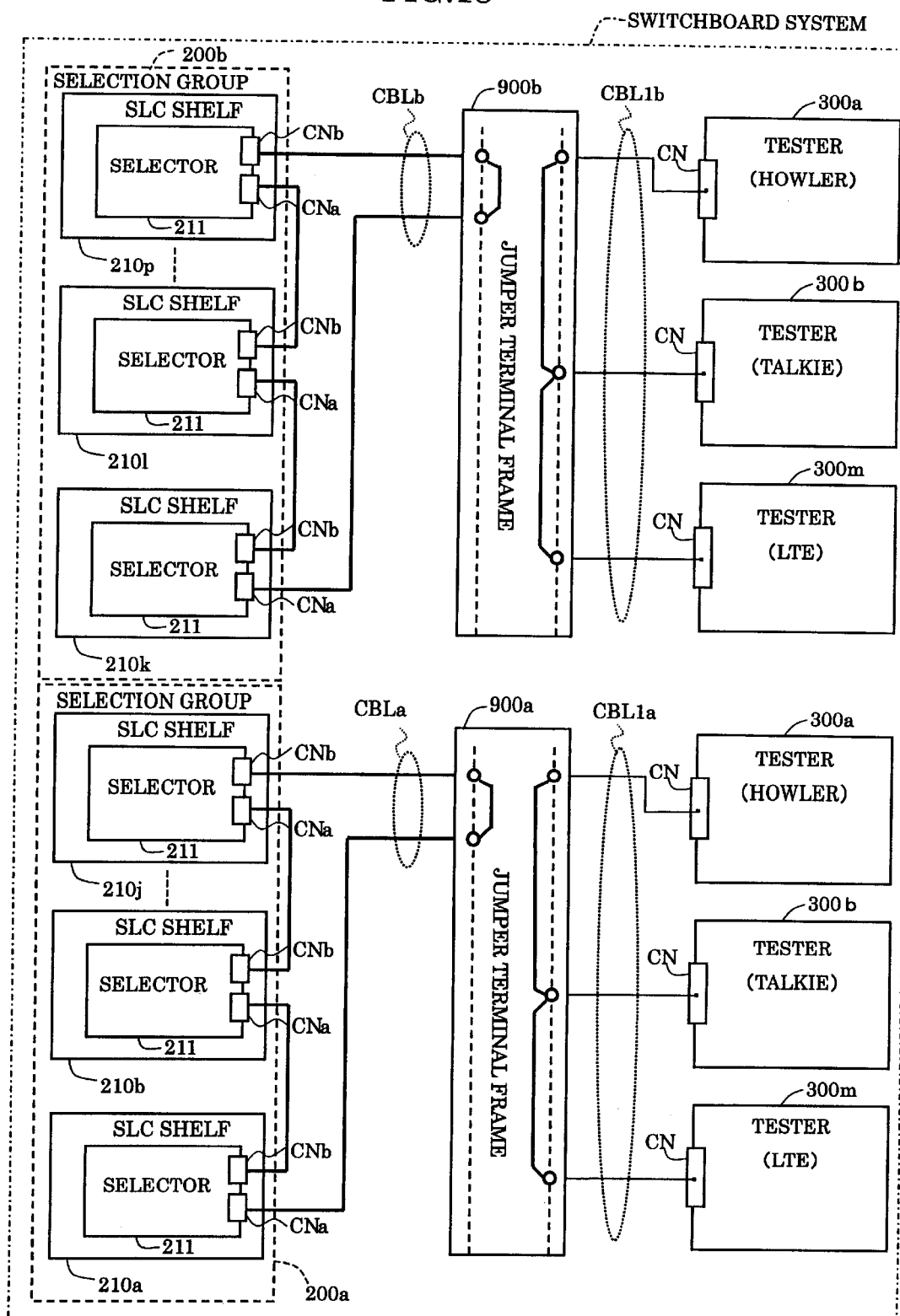
FIG. 18 is a block diagram showing an arrangement (2) of a switchboard having the prior art aggregated device of back wiring boards as components.
Figure 19A:
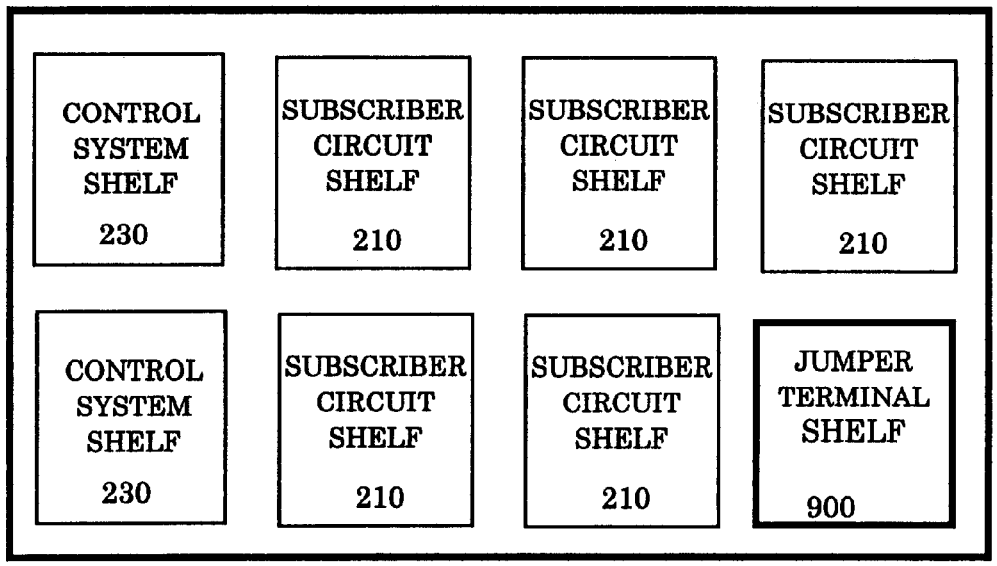
FIG. 19 is a block diagram showing shelf embodiments of a switchboard having an aggregated device of back wiring boards as components according to the prior art and the present invention.
Figure 19B:
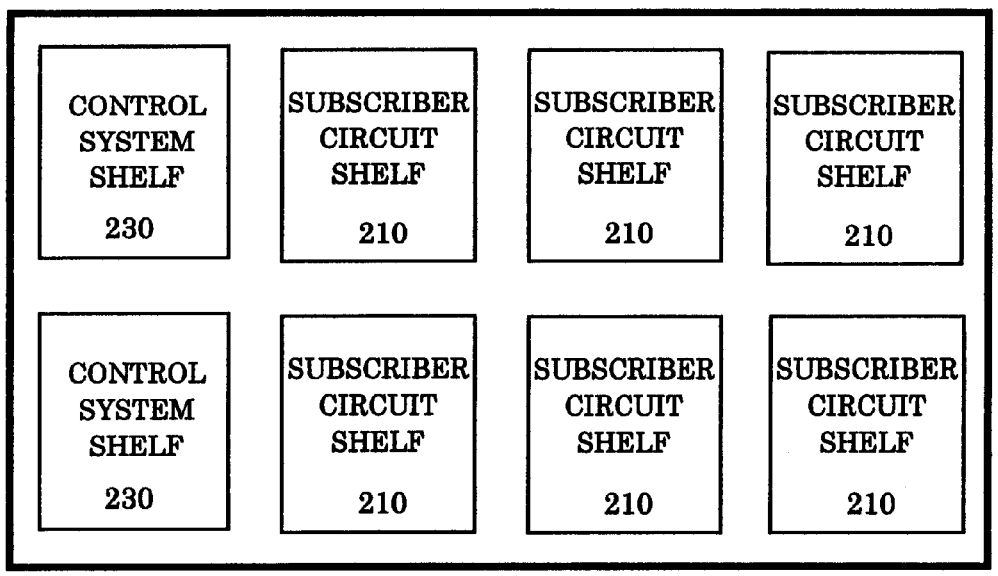

FIGS. 14–16 show operations (a)–(c) of the separation circuit 211d in the selector 211 in FIG. 10.

In the operation (a) shown in FIG. 14, the relay RL7b is turned "on", and a tester such as the subscriber circuit tester connected to the #2 circuit is to be connected to a tested circuit (not shown) of another selection group through the #2 circuit, the relay RL7b, and another #2 circuit.

In the operation (b) shown in FIG. 15, the relays RL7a, RL2 are turned "on", and a tester such as the subscriber circuit tester connected to the #2 circuit is to be connected to a tested circuit in the own selection group through the #2 circuit, the relays RL7a, RL2, and the connector CN2.

In the operation (c) shown in FIG. 16, the relays RL4, RL9 are turned "on", and a tester such as the subscriber circuit tester connected to the #4 circuit is to be connected to a tested circuit of the own selection group through the #4 circuit, the relays RL9, RL4, and the connector CN2.

As having described above, the back wiring board and the aggregated device according to the present invention are arranged such that a receiving portion receives a test demand signal from an external controller, and a selector selects one of plural testers connected to adapter connectors based on the test demand signal for the connection to a printed board package so that the device can be compacted and connection errors due to a maintenance person can be eliminated.

Also, since group connectors connect plural back wiring boards to form a board group, and the selector selects and connects one of the testers to only the printed board package connected to one of the back wiring boards within the board group based on the test demand signal, the total number of the testers to be mounted can be reduced.

What we claim is:

1. An aggregated device of back wiring boards, each of the back wiring boards mounting thereon a printed board package and comprising adapter connectors to be connected to a plurality of testers, a receiving portion for a test demand signal from an external controller and a selector for selecting and connecting one of the testers to the printed board package through the adapter connector based on the test demand signal;

each of the back wiring boards having group connectors to be connected to other back wiring boards to form a board group, and the selector selecting and connecting one of the testers to only the printed board package connected to one of the back wiring boards within the board group based on the test demand signal, wherein when the group connector is a first group connector, at least one of the back wiring boards within each of the board groups has at least one second group connector for connecting the board groups, the board groups mutually connected through the second group connector form a different board group, and within the different board group, the selector selects and connects one of the testers to only the printed board package connected to one of the back wiring boards based on the test demand signal.

2. The aggregated device of back wiring boards as claimed in claim 1, wherein the testers, the board groups, and the group connectors are layered corresponding to function and mounted positions of the testers.

3. The aggregated device of back wiring boards as claimed in claim 2, wherein the group connectors are composed of plural connectors connected in parallel with each other.

4. The aggregated device of back wiring boards as claimed in claim 2, wherein upper group connectors in each layer of the board groups are replaced by lower group connectors.

5. The aggregated device of back wiring boards as claimed in claim 1, wherein adapter connectors form the group connectors.

* * * * *